United States Patent
Baldaccini et al.

(10) Patent No.: US 8,453,465 B2
(45) Date of Patent: Jun. 4, 2013

(54) DEVICE FOR OPTIMIZING COOLING IN GAS TURBINES

(75) Inventors: Moreno Baldaccini, Montecarlo (IT); Roberto De Prosperis, Florence (IT)

(73) Assignee: Nuovo Pignone, S.p.A., Florence (IT)

(*) Notice: Subject to any disclaimer, the term of this patent is extended or adjusted under 35 U.S.C. 154(b) by 1744 days.

(21) Appl. No.: 11/752,275

(22) Filed: May 22, 2007

(65) Prior Publication Data

US 2010/0018219 A1 Jan. 28, 2010

(30) Foreign Application Priority Data

Jun. 1, 2006 (IT) .............................. MI2006A1086

(51) Int. Cl.
*F02C 7/18* (2006.01)

(52) U.S. Cl.
USPC ................ 60/806; 60/805; 60/785; 415/115

(58) Field of Classification Search
USPC .................. 60/805, 806, 785, 39.83; 415/115
See application file for complete search history.

(56) References Cited

U.S. PATENT DOCUMENTS

| | | | | |
|---|---|---|---|---|
| 2,445,661 A | * | 7/1948 | Hayne et al. ..................... | 60/799 |
| 2,791,091 A | * | 5/1957 | Wheatley et al. ............... | 60/806 |
| 2,891,382 A | * | 6/1959 | Broffitt ........................... | 60/806 |
| 3,652,177 A | * | 3/1972 | Loebel ............................ | 415/110 |
| 4,217,755 A | * | 8/1980 | Williams ........................ | 60/806 |
| 4,462,204 A | * | 7/1984 | Hull ................................ | 60/806 |
| 4,561,246 A | | 12/1985 | Hovan | |
| 4,653,267 A | | 3/1987 | Brodell et al. | |
| 5,722,778 A | * | 3/1998 | Kishikawa et al. ............ | 384/471 |
| 6,767,182 B2 | * | 7/2004 | Coppola ......................... | 415/115 |
| 6,966,191 B2 | | 11/2005 | Fukutani et al. | |
| 7,025,565 B2 | | 4/2006 | Urso et al. | |
| 7,059,827 B1 | * | 6/2006 | Ingistov ......................... | 415/170.1 |
| 2007/0039330 A1 | * | 2/2007 | Bladon et al. .................. | 60/785 |

FOREIGN PATENT DOCUMENTS

| | | |
|---|---|---|
| DE | 940226 C | 4/1956 |
| DE | 2745892 A1 | 4/1979 |
| EP | 1074694 | 2/2001 |
| FR | 955874 A | 1/1950 |
| GB | 2189845 A | 4/1987 |
| JP | 59226235 A | 12/1984 |
| JP | 60142022 A | 7/1985 |

(Continued)

OTHER PUBLICATIONS

EP Search Report issued Jul. 4, 2008 in connection with corresponding EP Application No. 07109019.5.

(Continued)

*Primary Examiner* — Ted Kim
(74) *Attorney, Agent, or Firm* — GE Global Patent Operation

(57) ABSTRACT

A device (30) for optimizing the cooling in a gas turbine of the type comprising at least one compressor, equipped with a combustion chamber (10) and an outer casing (16) and inner casing (32), at least one turbine wheel (14), equipped with a series of blades 12), and at least one high-pressure rotor (38), equipped with one or more supporting bearings (34), the compressor being capable of generating cooling air sent to the turbine wheel (14) through a suitable channel (20). On the outer surface of the device (30), there are one or more grooves (26) which allow the passage of additional flow-rates of air from the compressor towards the channel (20), in order to increase the overall cooling air flow towards said turbine wheel (14). The device (30) can be easily installed without the necessity of dismantling the outer casing (16), and is assembled on pre-existing machines in substitution of the vent tube (22) of the seals (36) of the supporting bearings (34).

7 Claims, 4 Drawing Sheets

FOREIGN PATENT DOCUMENTS

| | | | |
|---|---|---|---|
| JP | 64053002 | A | 3/1989 |
| JP | 4086334 | A | 3/1992 |
| JP | 05096401 | U | 12/1993 |
| JP | 8014064 | A | 1/1996 |
| JP | 2004346786 | A | 12/2004 |
| JP | 2005201275 | A | 7/2005 |
| JP | 2005344680 | A | 12/2005 |
| WO | WO2004/076821 | * | 9/2004 |

OTHER PUBLICATIONS

JP Office Action dated Sep. 20, 2011 from corresponding JP Application No. 2007-144315 along with unofficial English translation.
JP Notice of Allowance dated Aug. 7, 2012 from corresponding JP Application No. 2007-144315 along wth unofficial English translation.

* cited by examiner

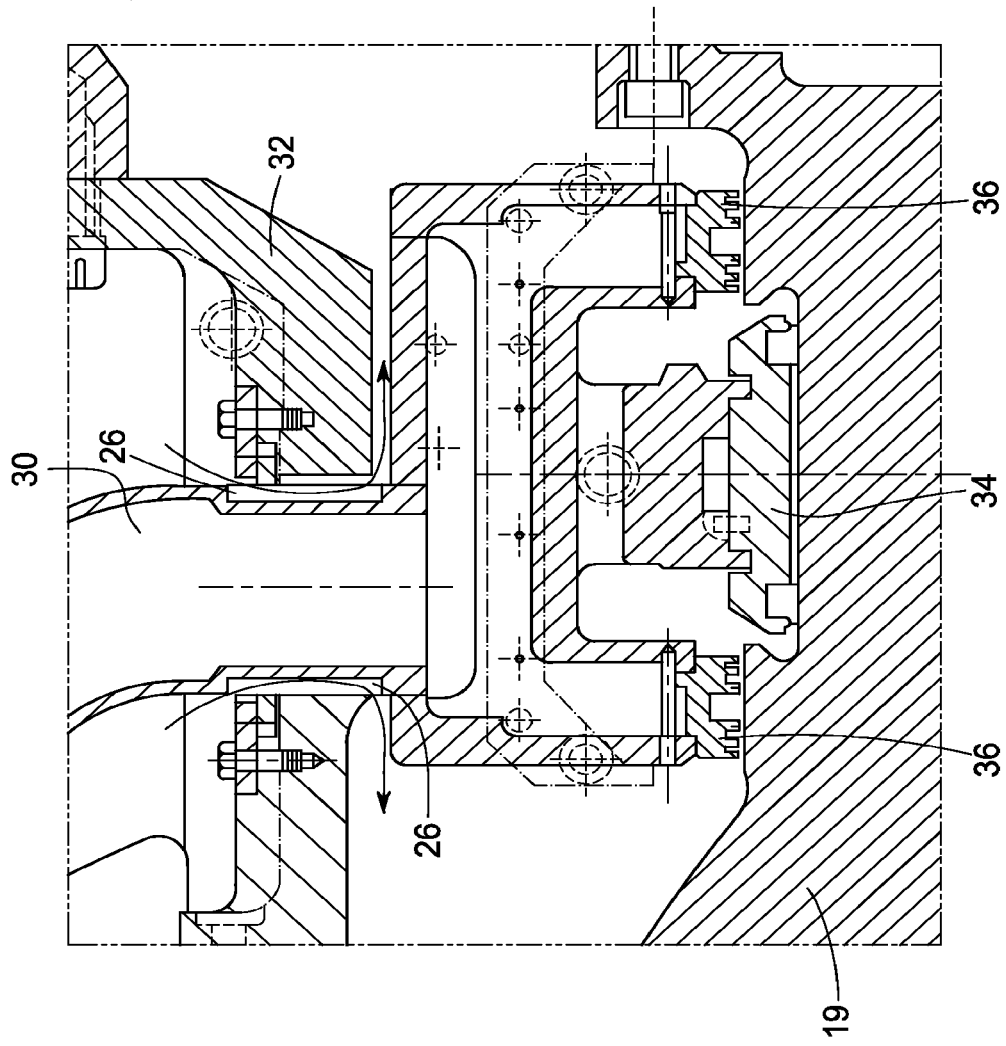

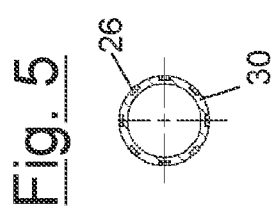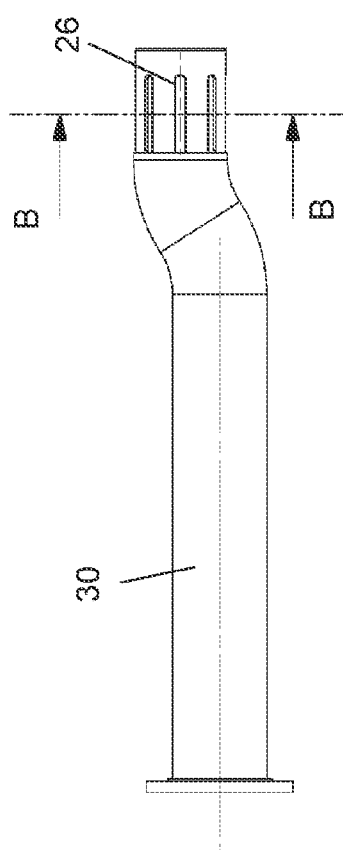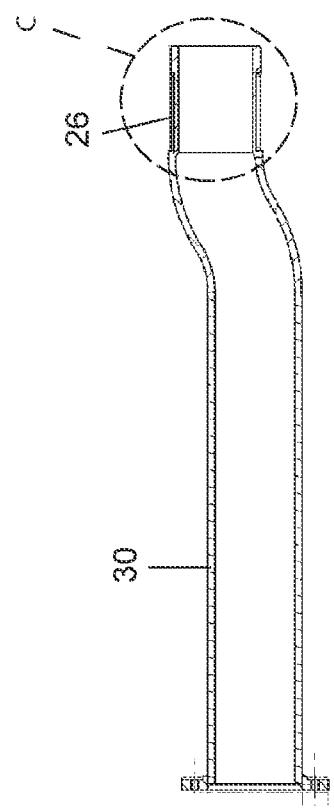

DEVICE FOR OPTIMIZING COOLING IN GAS TURBINES

FIELD OF THE INVENTION

The present invention relates to a component for gas turbines and, more specifically, a device for facilitating the cooling of the turbine wheel of the first phase of a gas turbine.

BACKGROUND OF THE INVENTION

A gas turbine, also called combustion turbine, is a rotary drive machine which transforms the potential energy contained in the combusted gas flow into mechanical energy transmitted to a rotating shaft.

Turbines normally comprise a compressor or turbo-compressor into which air removed from the outside is brought. In the combustion chamber(s) various nozzles therefore feed the fuel which is mixed with the air to form an air-fuel triggering mixture.

The compressor, of the axial type, is entrained by the turbine, which supplies mechanical energy transforming the enthalpy of the combusted gases in the combustion chamber.

In some applications, the expansion jump is subdivided into two partial jumps, each of which takes place inside a turbine. The high-pressure or first-phase turbine, downstream of the combustion chamber, entrains the compressor, whereas the low-pressure or second-phase turbine, which collects the gases coming from the high-pressure turbine, is then connected to the user.

The compressor, the combustion chamber, the various turbine phases, the outlet shaft, the control system and ignition system, form the essential parts of a gas turbine plant.

As far as the functioning of a gas turbine is concerned, it is known that the air is sucked into the compressor through an inlet duct. In this duct, the air has low-pressure and low-temperature characteristics whereas its pressure and temperature increase as it passes through the compressor. The air then penetrates the combustion chamber(s), where it takes part in the combustion process with a consequent further considerable increase in temperature.

The fuel can be of the liquid or gaseous type and is introduced into the combustion chamber by means of specific nozzles. The triggering of the combustion, when the machine is activated, is obtained by means of spark plugs.

When it leaves the combustion chamber, the high-pressure and high-temperature gas, resulting from the combustion, reaches the turbine phases where it yields part of the energy accumulated in the compressor and in the combustion chamber and then flows to the outside through outlet channels.

In gas turbines, the turbine wheels must normally be subjected to cooling to keep the functioning temperatures compatible with the characteristics of the material of the same turbine wheels. The cooling is normally effected by means of flows of air, extracted from the axial compressor and suitably conveyed, which is then sent radially towards the outside through the interspaces between the surface of each turbine wheel and the stator. These air flows touch the surfaces of the turbine wheels, cooling them.

In particular, in some applications of the known type, in correspondence with the compressor delivery, a labyrinth sealing system is installed, i.e. consisting of channels with a series of sectional enlargements and contractions, or another type of sealing system. The air flow which is drawn from said sealing, effects the cooling of the front surface (compressor side) of the first-phase turbine wheel.

Sometimes, as a result of an excessive sealing of the labyrinth system or for other reasons, the cooling air flow can be insufficient. As a consequence of this, there is an increase over the acceptable limits of the temperatures measured in correspondence with the front interspace between the first-phase turbine wheel and the stator, and therefore also an increase in the temperature of the turbine wheel itself. This can lead to a drastic reduction in the operative life of the turbine wheel.

In order to bring said temperatures back to acceptable values, it is therefore necessary to increase the cooling air flow coming from the compressor, this increase being effected, in turbines of the known type, by increasing the clearances of the sealing system or creating one or more holes having a suitable diameter in the inner casing in correspondence with the compressor delivery and cooling air channels. In order to be activated in pre-existing turbines, both solutions, however, require the dismantling of various components, which implies higher costs and also lengthy periods of inactivity for the whole machine.

BRIEF DESCRIPTION OF THE INVENTION

An objective of the present invention is therefore to provide a device, in particular for cooling the front surface of the turbine wheel of the first phase of a gas turbine, capable of solving the drawbacks described above, allowing additional cooling air flows to be obtained and varying their flow-rate, without having to effect onerous dismantling or processing/substitutions of the main components of the machine.

A further objective of the invention is to provide a device for gas turbines which is inexpensive, simple and rapid to install, so as to minimize the stoppage times of the machine and costs if it is to be installed on pre-existing turbines or subsequently further substituted to optimize the cooling air flow-rate.

These objectives according to the present invention are achieved by providing a device for optimizing the cooling of the turbine wheel of a first phase of a gas turbine as specified in claim 1.

Further objectives of the invention are indicated in the subsequent claims.

The characteristics and advantages of the device for optimizing the cooling in gas turbines according to the present invention will appear more evident from the following illustrative and non-limiting description, referring to the enclosed schematic drawings, in which:

BRIEF DESCRIPTION OF THE DRAWINGS

FIG. 3 is an enlarged sectional view of a part of the device according to the present invention, installed in the gas turbine;

FIG. 4 is a side view of the device according to the invention;

FIG. 5 is a transversal sectional view obtained along the line B-B of FIG. 4;

FIG. 6 is a longitudinal sectional view of the device according to the present invention; and FIG. 7 is an enlarged sectional view of the detail indicated with C in FIG. 6.

DETAILED DESCRIPTION OF THE INVENTION

Figure 1:
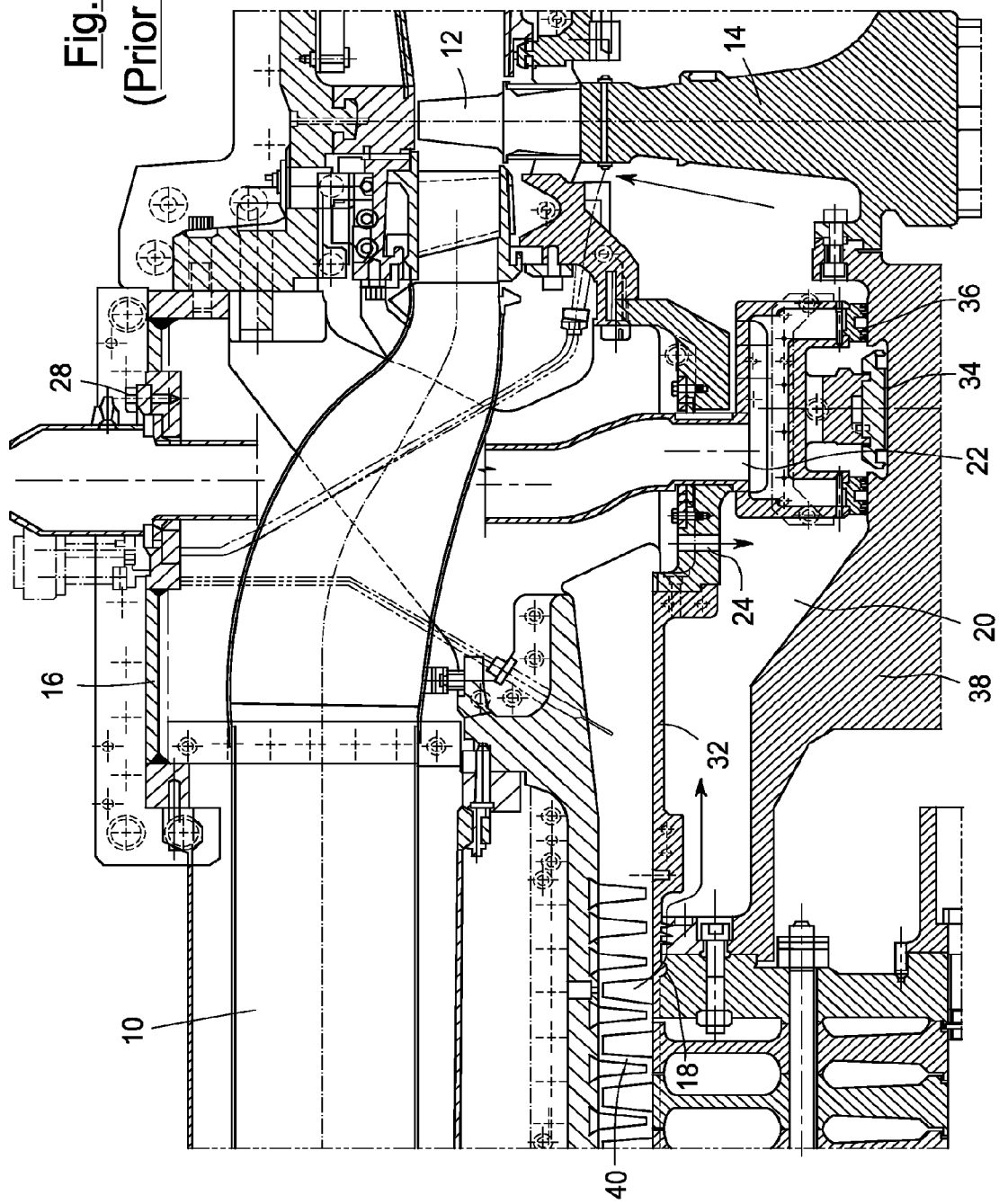
FIG. 1 is a sectional view which shows the area of the first phase of a gas turbine of the known type.
Figure 2:
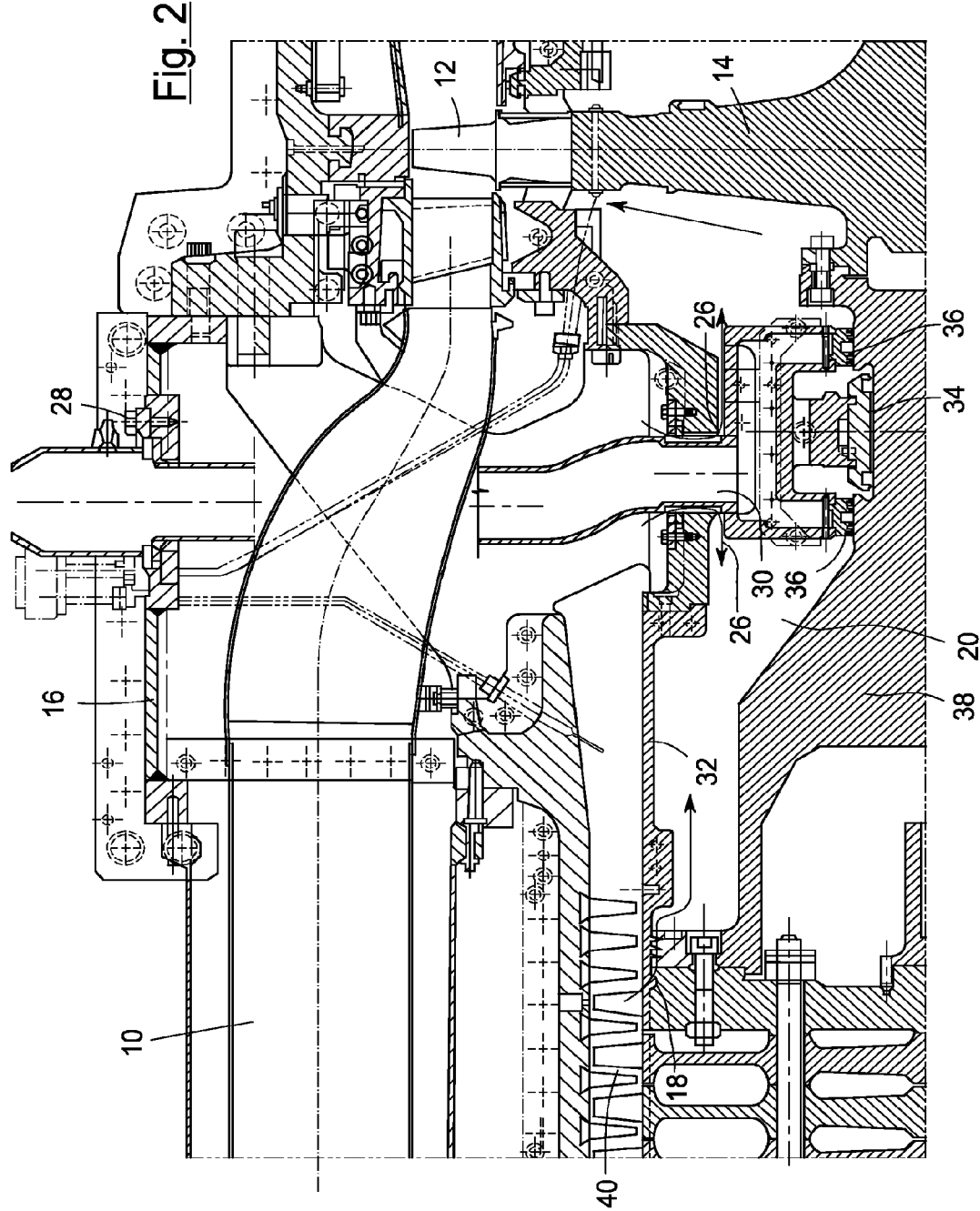
FIG. 2 is a sectional view which shows the area of the first step of a gas turbine equipped with the device for optimizing the cooling according to the present invention.

With particular reference to FIGS. 1 and 2 of the enclosed drawings, these show part of a combustion chamber of a gas turbine, indicated with the reference number 10, some blade phases 40 on the delivery side of an axial compressor, the blades 12 of the first-phase turbine, the first-phase turbine wheel 14, an outer casing 16 and an inner casing 32.

On the end of the inner casing 32 facing the compressor, a sealing system 18 is installed through which the air, coming from the compressor, is drawn, destined for cooling the front surface (compressor side) of the first phase turbine wheel 14.

The reference number 34 then indicates a supporting bearing of the high-pressure rotor 38, with the relative seals 36 for the lubricating oil. The other supporting bearing and the thrust bearing are situated on the suction side of the axial compressor and are not shown.

The cooling air is sent, through a suitable channel 20, on the basis of the run indicated with the arrows represented in FIGS. 1 and 2, towards the interspace between the first-phase turbine wheel 14 and the stator parts, so as to touch the front surface (compressor side) of the first-phase turbine wheel 14, cooling it and also preventing the inlet of hot gases into the interspace.

Finally, a vent tube 22 is envisaged (FIG. 1) in communication with the outside, whose function is to maintain an adequate air pressure in the seals 36 of the bearings 34, in order to allow an optimum blockage of the lubricating oil without pressurizing the discharge duct of the oil itself.

Said vent tube 22 has the characteristic of being able to be installed and removed from the outside of the machine. It is in fact blocked on the outer casing 16 by fixing means 28 and is simply inserted in a suitable housing situated in the inner casing 32.

In FIG. 1 it can be seen how, in order to increase the flow of cooling air towards the front side of the turbine wheel 14, it has so far been necessary, as an alternative to a more complicated modification of the sealing system 18, to produce one or more holes 24 directly on the inner casing 32, in order to increase the overall air flow-rate directed towards the turbine wheel itself 14.

FIG. 2, on the other hand, shows the device 30 for optimizing the cooling in gas turbines according to the present invention, installed in the machine which substitutes the vent tube 22. The device 30 is illustrated in detail in FIG. 3 and in the subsequent figures and is produced in the form of a duct. Although its function of maintaining an adequate air pressure in the seal 36 of the bearing 34 remains unaltered, it is capable of directing an additional quantity of cooling air into the channel 20 without the necessity of additional holes on the inner casing 32 and without the necessity of modifying the sealing system 18.

More specifically, and with specific reference to FIG. 3 and the subsequent figures, on the outer surface of the duct which forms the device 30, object of the invention, there are one or more grooves 26 which, once the device itself 30 has been assembled in an operative position inserted in the specific circular opening of the inner casing 32 and blocked on the outer casing 16 by means of the fixing elements 28, allow the passage of additional air flow-rates from the compressor towards the channel 20, so as to increase the overall flow of cooling air towards the front surface of the turbine wheel 14.

On the basis of the embodiment illustrated, the grooves 26 are situated in an axial direction of the duct which forms the device 30, object of the invention, and are obtained in the portion of the device 30 itself destined for being inserted in the wall of the inner casing 32, thus forming actual outlet holes towards the channel 20 for the air coming from the compressor.

It should be pointed out that both the dimensions and the number of grooves 26 can be established according to the further quantity of cooling air, in addition to that conventionally supplied through the sealing system 18, which is to be obtained on the basis of the operative conditions of the turbine wheel 14. In particular, it is sufficient to rapidly and simply substitute a common vent tube 22 with the device 30, or also the same device 30 with another having similar characteristics but different grooves 26, to vary and optimize the overall flow-rate of cooling air inside the channel 20.

Whereas an insufficient cooling air flow-rate to the first-phase turbine wheel 14 reduces the operative life of the turbine wheel 14 itself, an excessive air flow-rate negatively influences the performances (power supplied and yield) of the gas turbine. The device 30 therefore allows the cooling air flow-rate to be regulated to safeguard both the operative life of the turbine wheel 14 and the performances of the whole machine.

It can thus be seen that the device 30 according to the present invention achieves the objectives previously specified in a surprisingly simple and economical way, also in view of the reduced cost of the device 30 itself, allowing the quantity of cooling air to be supplied to the front surface of the first-phase turbine wheel to be increased and optimized without the necessity of effecting onerous dismantling and modifications of the main components of the machine. The easy substitution of the device 30 with others which allow the passage of different quantities of air, also allows the cooling conditions of the turbine wheel and performances of the machine to be optimized in relation to the different operating conditions and requirements.

The device for optimizing the cooling in gas turbines of the present invention thus conceived can in any case undergo numerous modifications and variants, all included in the same inventive concept.

Furthermore, in practice the materials used, as also the dimensions and components, can vary according to technical requirements.

What is claimed is:

1. A device for optimizing the cooling in a gas turbine, the gas turbine having at least one compressor equipped with a combustion chamber and an outer casing and an inner casing, at least one turbine wheel equipped with a series of blades, and at least one high-pressure rotor equipped with one or more supporting bearings, said compressor configured to generate cooling air sent to said turbine wheel through a channel, the device comprising:
   a housing dimensioned to mate with an opening in the inner casing and further configured to connect to the outer casing; and
   at least one groove axially disposed on an outer surface of the housing, which when the housing is mated to the inner casing, forms a cooling air passage which opens directly into the channel through which additional flow-rates of air from said compressor flows to supplement a cooling air flow from a sealing system of the gas turbine towards said turbine wheel.

2. The device according to claim 1, wherein the device is fixable in position on said outer casing by means of one or more fixing elements.

3. The device according to claim 1, wherein said grooves are obtained in the portion of said device destined for being inserted in the wall of said inner casing.

4. The device according to claim 1, wherein the dimensions, form and number of said grooves are established according to the quantity of cooling air to be supplied on the basis of the cooling requirements of said turbine wheel, at the same time safeguarding the performances of the gas turbine.

5. The device according to claim 1, wherein the device is installable in substitution of the a vent tube of the a plurality of seals of said one or more supporting bearings, said device also having the function of maintaining an adequate air pressure in said seals of said one or more supporting bearings.

6. The device according to claim 1, wherein the device is used for the cooling of the front surface, facing said compressor, of said turbine wheel of a first phase of a gas turbine.

7. A gas turbine comprising a device according to claim 1.

* * * * *